United States Patent
McClelland (10) Patent No.: US 7,315,612 B2
(45) Date of Patent: Jan. 1, 2008

(54) SYSTEMS AND METHODS FOR FACILITATING COMMUNICATIONS INVOLVING HEARING-IMPAIRED PARTIES

(75) Inventor: William A. McClelland, Cedar Rapids, IA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 60 days.

(21) Appl. No.: 10/979,093

(22) Filed: Nov. 2, 2004

(65) Prior Publication Data

US 2005/0094777 A1    May 5, 2005

Related U.S. Application Data (63) Continuation-in-part of application No. 10/798,348, filed on Mar. 12, 2004, now Pat. No. 7,236,574, which is a continuation-in-part of application No. 10/699,823, filed on Nov. 4, 2003, now Pat. No. 7,200,208.

(60) Provisional application No. 60/545,954, filed on Feb. 20, 2004, provisional application No. 60/517,899, filed on Nov. 7, 2003.

(51) Int. Cl.
*H04M 11/00* (2006.01)

(52) U.S. Cl. ................................ 379/52; 379/93.15

(58) Field of Classification Search .............. 379/52, 379/93.15, 93.35, 93.09, 93.17, 93.21, 93.23, 379/93.24, 93.34, 90.01, 218.02, 207.02; 704/206, 227; 370/352

See application file for complete search history.

(56) References Cited

U.S. PATENT DOCUMENTS

| | | | |
|---|---|---|---|
| 5,680,443 A * | 10/1997 | Kasday et al. ........... 379/88.13 |
| 5,745,550 A * | 4/1998 | Eisdorfer et al. ............. 379/52 |
| 5,787,148 A | 7/1998 | August | |
| 5,809,112 A * | 9/1998 | Ryan ............................ 379/52 |
| 5,959,629 A * | 9/1999 | Masui ........................ 715/808 |
| 5,991,723 A * | 11/1999 | Duffin .......................... 379/52 |
| 6,188,429 B1 * | 2/2001 | Martin et al. ................. 379/52 |
| 6,389,114 B1 | 5/2002 | Dowens et al. | |
| 6,421,425 B1 | 7/2002 | Bossi et al. | |
| 6,430,602 B1 | 8/2002 | Kay et al. | |
| 6,480,484 B2 | 11/2002 | Morton | |
| 6,603,835 B2 * | 8/2003 | Engelke et al. ............... 379/52 |
| 6,611,804 B1 | 8/2003 | Dorbecker et al. | |
| 6,628,967 B1 | 9/2003 | Yue | |
| 6,714,793 B1 | 3/2004 | Carey et al. | |
| 6,757,732 B1 | 6/2004 | Sollee et al. | |
| 6,801,613 B1 | 10/2004 | Hamilton | |
| 6,914,964 B1 * | 7/2005 | Levine ......................... 379/52 |
| 6,950,500 B1 * | 9/2005 | Chaturvedi et al. .......... 379/52 |
| 6,950,501 B1 * | 9/2005 | Chaturvedi et al. .......... 379/52 |

(Continued)

FOREIGN PATENT DOCUMENTS

WO     03/021796     3/2003

*Primary Examiner*—Stella Woo (57) ABSTRACT

A method for providing communication services for communications between a hearing-impaired party and a hearing party includes establishing a voice link with the hearing party. The method also includes receiving a voice message from the hearing party via the voice link and generating a text message corresponding to the voice message using voice recognition. The method may also include transmitting the text message to the hearing-impaired party. Optionally, a high speed text input device may also be used with, or instead of, the voice recognition to generate the text message.

40 Claims, 3 Drawing Sheets

U.S. PATENT DOCUMENTS

| | | |
|---|---|---|
| 2002/0037074 A1 | 3/2002 | Dowens et al. |
| 2002/0057765 A1 | 5/2002 | Hyziak et al. |
| 2002/0065820 A1 | 5/2002 | Enns |
| 2002/0143533 A1* | 10/2002 | Lucas et al. ................ 704/235 |
| 2002/0199019 A1 | 12/2002 | Battin et al. |
| 2003/0072420 A1* | 4/2003 | Feigenbaum ................ 379/52 |
| 2004/0024822 A1 | 2/2004 | Werndorfer et al. |
| 2004/0111268 A1 | 6/2004 | Steel |

\* cited by examiner

SYSTEMS AND METHODS FOR FACILITATING COMMUNICATIONS INVOLVING HEARING-IMPAIRED PARTIES

RELATED APPLICATION

This application is a continuation-in-part of U.S. patent application Ser. No. 10/798,348 filed Mar. 12, 2004, now U.S. Pat. No. 7,236,574 which is a continuation-in-part of U.S. patent application Ser. No. 10/699,823 filed Nov. 4, 2003, now U.S. Pat. No. 7,200,208 the disclosures of which are both hereby incorporated by reference herein. This application also claims priority under 35 U.S.C. § 119 based on U.S. Provisional Application Ser. No. 60/545,954 filed Feb. 20, 2004 and U.S. Provisional Application Ser. No. 60/517,899 filed Nov. 7, 2003, the disclosures of which are both hereby incorporated by reference herein.

FIELD OF THE INVENTION

The present invention relates to providing communication services and, more particularly, to providing communication services for hearing-impaired parties.

BACKGROUND OF THE INVENTION

A conventional telecommunication device for the deaf/teletype (TDD/TTY) enables people who are hearing-impaired or deaf to communicate with other parties via standard telephone lines. For example, one way in which a deaf party may communicate with another party is if both parties use a TDD. In this case, a calling party may type using a standard keyboard included with the TDD and the called party reads the message on a display associated with his/her TDD. The called party may similarly type a message using his/her TDD and the calling party may read the message using his/her display.

A second way in which a hearing-impaired/deaf person may communicate via standard telephone lines is referred to as relay. In this case, a conference call is established between a first party, a communication assistant (CA) (also referred to as a relay operator) and a second party. The first party may be a deaf person who has a TDD/TTY and the second party may be a person with normal hearing who does not have a TDD/TTY device.

When the deaf party wishes to make a call, he/she dials a telephone number for the CA and tells the CA the telephone number to which he/she would like to be connected. The CA may dial the number and provide a greeting to the hearing party. When the hearing party speaks, the CA types what is said and the deaf party reads the text using the TDD/TTY's display. The deaf party may respond to the message on the display by typing on his/her TDD/TTY. The CA reads what is typed to the hearing party in a normal manner. In this manner, the deaf party may communicate with hearing and hearing-impaired parties over the public switched telephone network using conventional TDD/TTY equipment.

One problem with the communication methods described above is that a TDD/TTY is required in order for the hearing-impaired party to communicate. This may prevent the hearing-impaired party from being able to communicate with others at various times due to the lack of an available TDD/TTY device. For example, if the hearing-impaired party is not at home, the hearing-impaired party may not have access to a TDD/TTY device.

Another problem with the communication methods described above is that the CA must type what the hearing party says using a conventional keyboard and transmit the text to the hearing-impaired party. This is often a time consuming process that significantly slows down the "conversation" between the two parties.

SUMMARY OF THE INVENTION

According to one aspect of the invention, a method for providing communication services for communications between a hearing-impaired party and a hearing party includes establishing a voice link with the hearing party. The method also includes receiving a first voice message from the hearing party via the voice link and generating a first text message corresponding to the first voice message using voice recognition. The method further includes transmitting the first text message to the hearing-impaired party.

According to a further aspect of the invention, a system including a server and a first device associated with a first communication assistant is provided. The server is configured to receive a call from a hearing-impaired party for establishing a communication link to a hearing party. The server is also configured to identify a communication assistant and forward the call to the identified communication assistant. The first device is configured to receive the forwarded call from the server and establish a voice link with the hearing party. The first device is also configured to receive a voice message from the hearing party and generate a text message corresponding to the voice message using voice recognition.

According to another aspect of the invention, a method for providing communications services includes receiving a call from a hearing-impaired party for establishing a communication link to a hearing party. The method also includes identifying a communication assistant and forwarding the call to the identified communication assistant. The method further includes establishing, by the communication assistant, a voice link with the hearing party and receiving, by the communication assistant, a voice message from the hearing party via the voice link. The method additionally includes generating, by the communication assistant, a text message corresponding to the voice message using a high speed text input device and transmitting the text message to the hearing-impaired party.

According to yet another aspect of the invention, a system including processing logic and a transmit element is provided. The processing logic is configured to receive a voice message from a first party and generate a text message corresponding to the voice message using voice recognition. The transmit element is configured to transmit the text message to a hearing-impaired party.

According to still another aspect of the invention, a method that includes receiving a first voice message from a hearing party via a voice link is provided. The method also includes generating at least one of a second voice message or a first text message corresponding to the first voice message using voice recognition. The method further includes transmitting the second voice message or first text message to the hearing party for verification.

Other features and advantages of the invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

Figure 1:
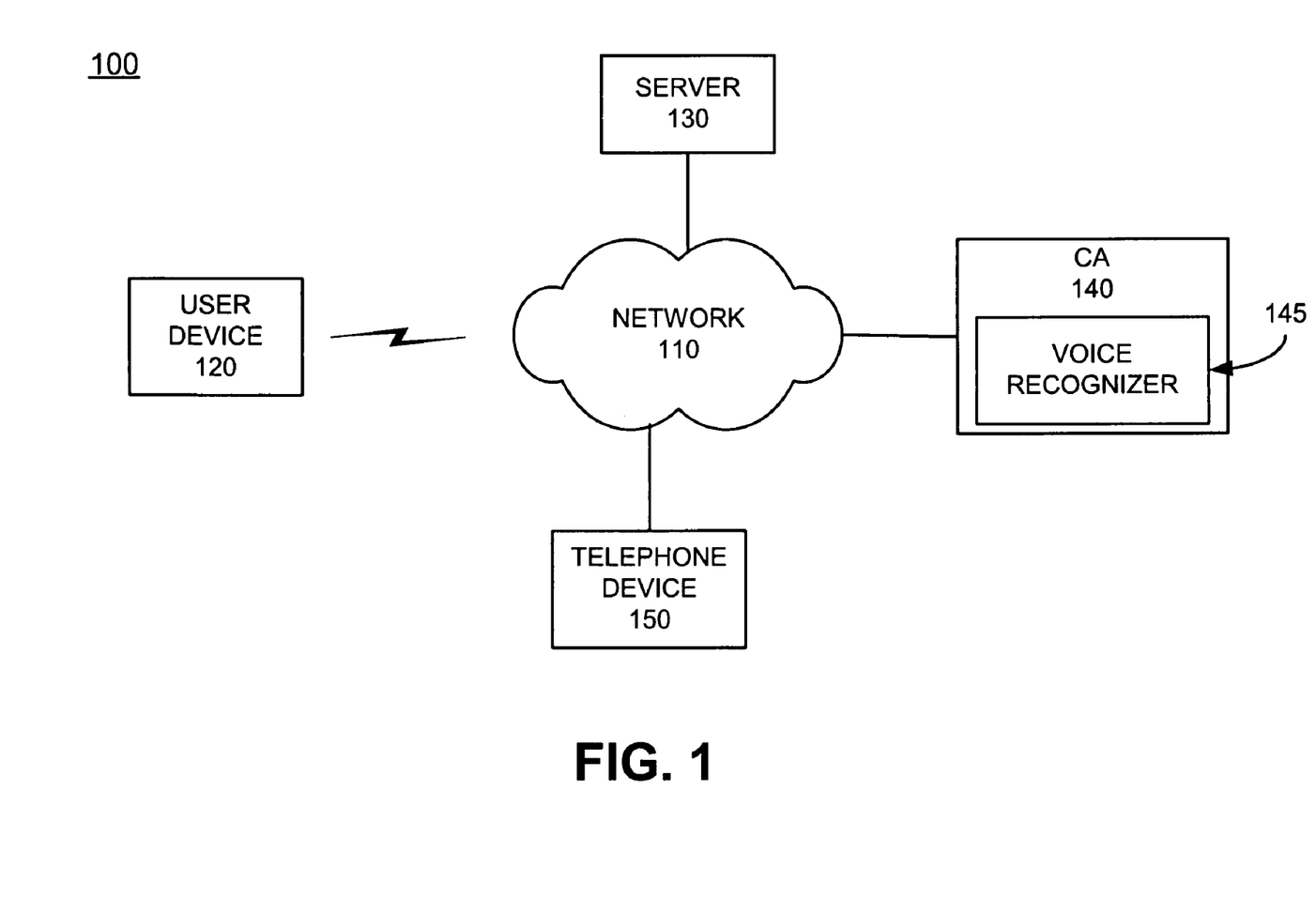
FIG. 1 illustrates an exemplary system in which methods and systems consistent with the invention may be implemented.

FIG. 1 is a block diagram of an exemplary system 100 in which methods and systems consistent with the present invention may be implemented. System 100 may include network 110, user device 120, server 130, CA 140, and telephone device 150. The exemplary configuration illustrated in FIG. 1 is provided for simplicity. It should be understood that a typical system may include more or fewer devices than illustrated in FIG. 1. For example, a conference bridge device/platform that links multiple parties in a conference call and the associated telephone circuits, switching devices, software or hardware controlled devices, etc., involved in completing the conference call may be included in system 100. These devices may be used to facilitate communications involving a hearing-impaired party, a CA and a hearing party.

Network 110 may include one or more wired and/or wireless networks that are capable of receiving and transmitting data and voice signals. For example, network 110 may include one or more public switched telephone networks (PSTNs) or other type of switched network. Network 110 may also include packet switched networks, such as the Internet, an intranet, a local area network (LAN), a wide area network (WAN), or another type of network that is capable of transmitting data from a source device to a destination device. Network 110 may also include one or more wireless networks and may include a number of transmission towers for receiving wireless signals and forwarding the wireless signals toward the intended destination.

Network 110 may further include one or more devices, such as a network gateway, that allow divergent transport networks to communicate and cooperatively carry traffic. A network gateway may provide for interoperation at two levels, e.g., between different signaling schemes and between different media forms. For example, the network gateway may adapt between SS7 signaling used in a portion of network 110 and session initiation protocol (SIP) or H.323 protocols used by another portion of network 110. The network gateway may also adapt analog or pulse code modulation (PCM) encoded voice signals to a packetized data stream suitable for transport over network 110.

User device 120, consistent with the present invention, may include any device that is able to execute some form of text messaging. For example, user device 120 may include a conventional TDD/TTY. User device 120 may also include a conventional plain old telephone system (POTS) phone with a text screen to display text messages or an Internet protocol (IP) telephone with a text screen that is configured to transmit and receive voice messages using, for example, voice over Internet protocol (VoIP). User device 120 may also include a computing device, such as a personal computer (PC), laptop computer, personal digital assistant (PDA) or a web-based appliance that is able to execute a text messaging program and transmit and receive data via network 110 using, for example, VoIP. User device 120 may further include any wireless device that is able to execute a text messaging program. For example, user device 120 may include a cellular telephone, PDA, computer or a web-based appliance that is able to execute a text messaging program, such as an instant messaging program, and transmit and receive data via a wireless network.

Server 130 may include any server/computing device that is able to connect to network 110 and transmit and receive data via network 110. Server 130 may include a firewall (not shown) that provides security-related services for server 130. Server 130 may also include a gateway (not shown) that supports persistent, full duplex transmission control protocol (TCP)/Internet Protocol (IP) connections between server 130 and user device 120 and other devices/parties, such as CA 140. For example, the gateway may include one or more call processors that enable a client application programming interface (API) to maintain a persistent socket connection between a client application executed by user device 120 and CA 140. Server 130, as described in more detail below, enables a hearing-impaired user to establish communications with a CA to facilitate communications with a desired party.

CA 140 may represent any conventional CA workstation/computer and operator used to facilitate communications between a hearing-impaired party and a hearing party. CA 140 may include a workstation or computer, such as a personal computer or laptop. CA 140 may be used in any telerelay services (TRS) environment, such as a voice carry over (VCO) environment, a hearing carry over (HCO) environment, a speech-to-speech (STS) environment, etc.

In an exemplary implementation consistent with the invention, CA 140 may include a voice recognizer 145 that performs voice or speech recognition. Voice recognizer 145 may include software and/or hardware that is able to convert received voice messages into text messages, as described in more detail below.

In another exemplary implementation, CA 140 may include a high speed text input device, such as a stenographic device, a communication access real-time translation (CART) device, etc. These high speed text input devices may enable an operator at CA 140 to keep up with a conversation between a hearing party and a hearing-impaired party, as described in more detail below.

CA 140 may also include any conventional telephone (not shown), such as one used by a hearing party, that interfaces with the PSTN to place and receive telephone calls. For example, the telephone device may be a standard telephone, a cordless telephone, a cellular telephone or any other type of conventional telephone. The telephone device may also include any type of device that is capable of transmitting and receiving voice signals to/from a data network. For example, the telephone device may include any client, such as a computer device, a web-based appliance, etc., that is configured to provide telephone functions. The telephone device may, for example, be a session initiation protocol (SIP)-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional PC, laptop computer or other computing device.

Telephone device 150 may include any type of device that is capable of transmitting and receiving voice signals to/from a data network, such as network 110. For example, telephone device 150 may include any conventional telephone, such as those used by a hearing party, that interfaces with the PSTN to place and receive telephone calls. Telephone device 150 may be a standard telephone, a cordless telephone, a cellular telephone or any other type of conventional telephone.

Telephone device 150 may also include any client, such as a computer device, a web-based appliance, etc., that is configured to provide telephone functions. Telephone device 150 may, for example, be a SIP-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional PC, laptop computer or other computing device.

In an exemplary implementation consistent with the invention, server 130 provides a platform for enabling a hearing-impaired party to establish communications with CA 140. Server 130 and CA 140 are illustrated in FIG. 1 as being connected via network 110. In alternative implementations, server 130 and CA 140 may be connected directly to each other, connected via a LAN, connected via a private network, etc. In still other alternative implementations, the functions performed by server 130 and CA 140, described in more detail below, may be performed by a single device/platform.

Figure 2:
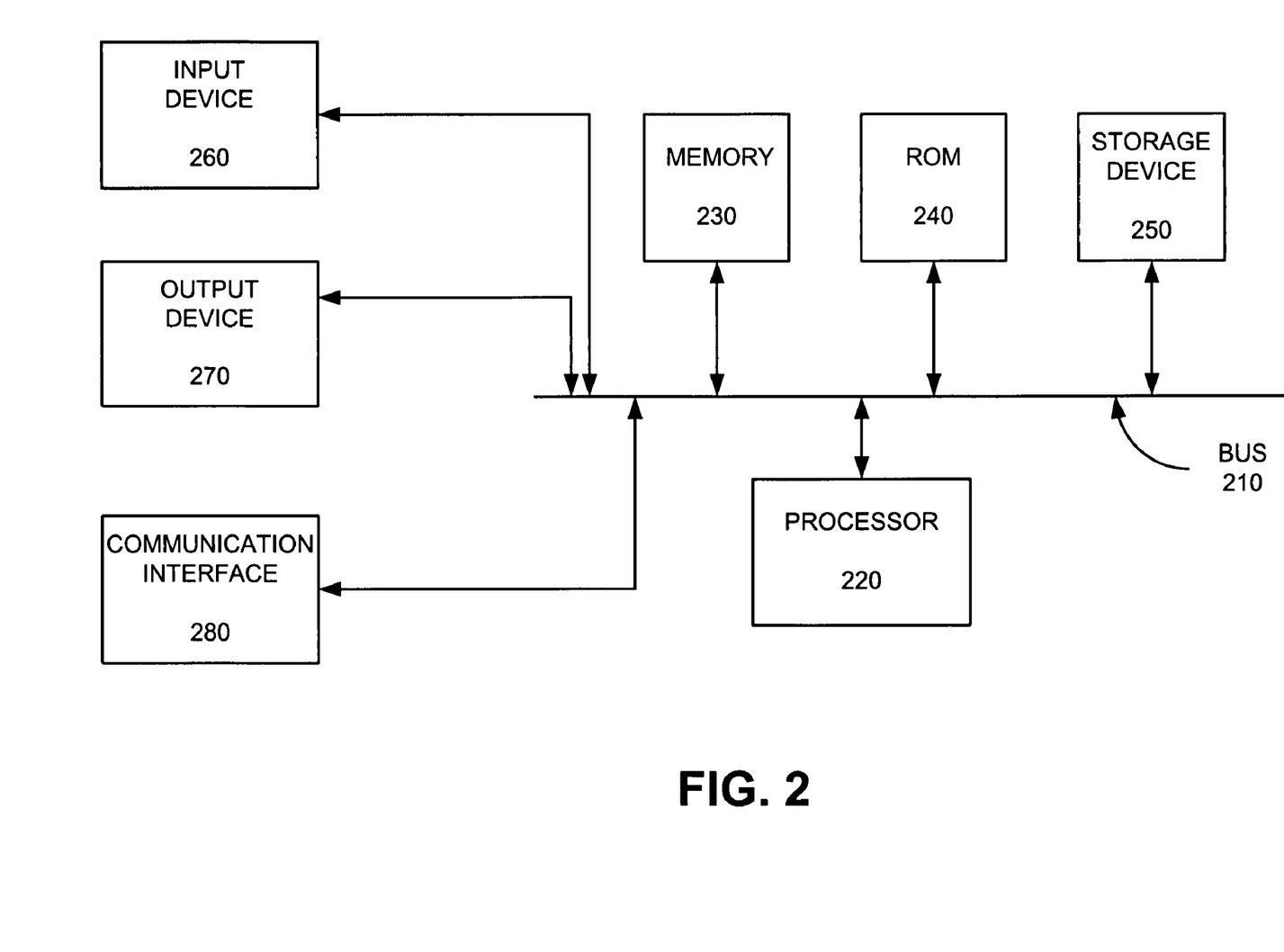
FIG. 2 is an exemplary block diagram of the server or CA of FIG. 1 consistent with the invention.

FIG. 2 illustrates an exemplary configuration of server 130 and CA 140 in an implementation consistent with the invention. Other configurations may alternatively be used. Server 130/CA 140 may include a bus 210, a processor 220, a memory 230, a read only memory (ROM) 240, a storage device 250, an input device 260, an output device 270, and a communication interface 280. Bus 210 permits communication among the components of server 130.

Processor 220 may include any type of conventional processor or microprocessor that interprets and executes instructions. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a conventional ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions.

Input device 260 may include one or more conventional mechanisms that permit an operator to input information to server 130, such as a keyboard, a mouse, a pen, voice recognition and/or biometric mechanisms, etc. Output device 270 may include one or more conventional mechanisms that output information to the operator, including a display, a printer, one or more speakers, etc. Communication interface 280 may include any transceiver-like mechanism that enables server 130 to communicate with other devices and/or systems. For example, communication interface 280 may include a modem or an Ethernet interface to a LAN. Alternatively, communication interface 280 may include other mechanisms for communicating via a network.

Server 130, consistent with the invention, provides a platform through which user device 120 may establish communications with CA 140. According to an exemplary implementation, server 130 performs processing associated with establishing communications with user device 120 in response to processor 220 executing sequences of instructions contained in memory 230. Such instructions may be read into memory 230 from another computer-readable medium, such as storage device 250, or from a separate device via communication interface 280. It should be understood that a computer-readable medium may include one or more memory devices or carrier waves. Execution of the sequences of instructions contained in memory 230 causes processor 220 to perform the acts that will be described hereafter. In alternative embodiments, hard-wired circuitry may be used in place of or in combination with software instructions to implement the present invention. Thus, the present invention is not limited to any specific combination of hardware circuitry and software.

CA 140, consistent with the present invention, provides a platform through which a hearing-impaired party at user device 120 may communicate with a party at telephone device 150. According to an exemplary implementation, voice recognizer 145 is implemented at CA 140 and performs voice-to-text conversion in response to processor 220 executing sequences of instructions contained in memory 230. Such instructions may be read into memory 230 from another computer-readable medium, such as storage device 250, or from a separate device via communication interface 280. Execution of the sequences of instructions contained in memory 230 causes processor 220 to perform the acts that will be described hereafter. In alternative embodiments, hard-wired circuitry may be used in place of or in combination with software instructions to implement the present invention. Thus, the present invention is not limited to any specific combination of hardware circuitry and software.

In addition, voice recognizer 145 is illustrated in FIG. 1 as being implemented in CA 140. It should be understood that voice recognizer 145 may be located externally from CA 140 in other implementations.

Figure 3:
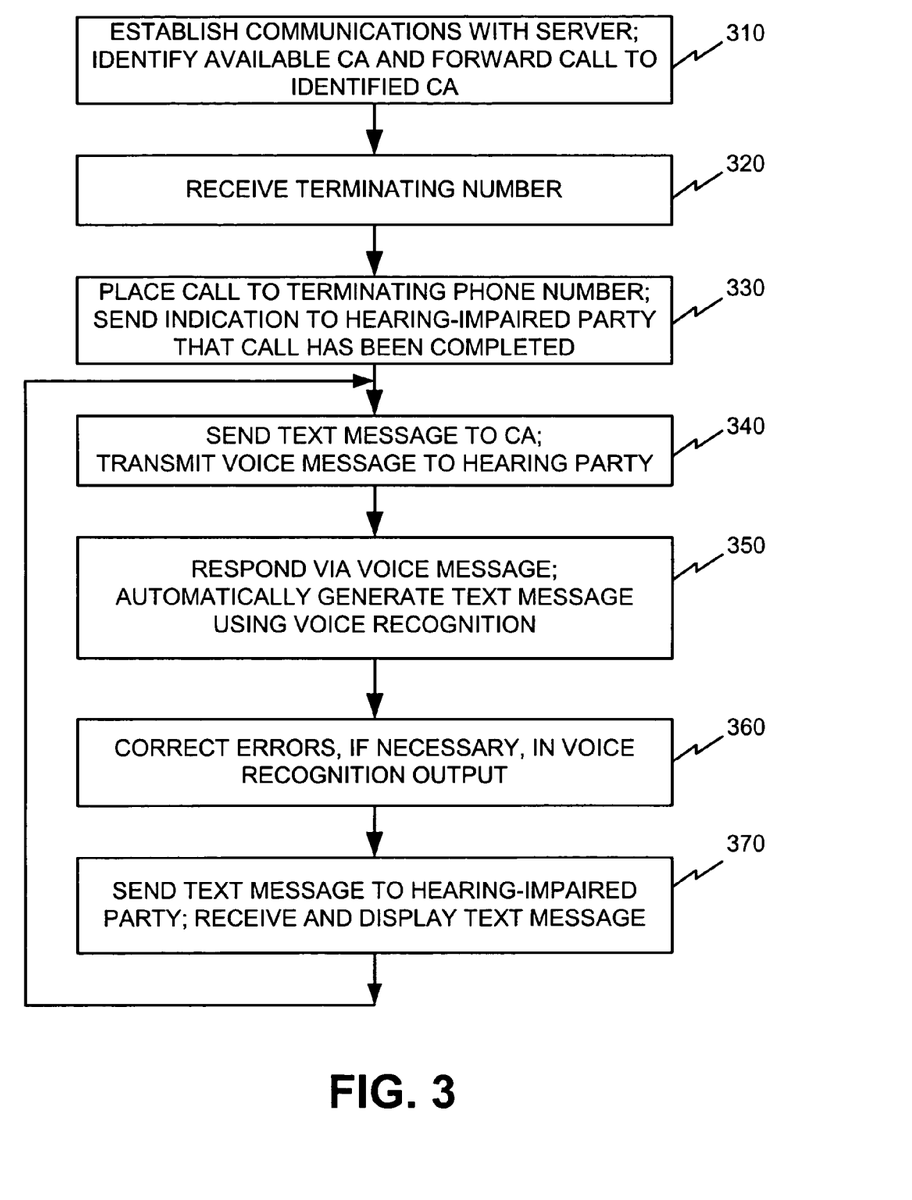
FIG. 3 is a flow diagram illustrating exemplary processing associated with providing communication services for a hearing-impaired party in an implementation consistent with the invention.

FIG. 3 is a flow diagram illustrating exemplary processing associated with providing communication services for a hearing-impaired party in an implementation consistent with the invention. Processing may begin with a hearing-impaired party at user device 120 wanting to establish communications with another party, such as a party at telephone device 150. In this case, the hearing-impaired party may establish communications with server 130 (act 310).

For example, the hearing-impaired party may place a call to a telephone number associated with server 130 via user device 120. Server 130, as discussed above, may represent a platform/system that hearing-impaired parties call when they wish to obtain assistance in communicating with a hearing party. The call from user device 120 to server 130 may be conventional call using, for example, a conventional POTS telephone, a wireless device or an IP-based telephone.

Server 130 receives the call and may identify an available CA to handle the call (act 310). For example, server 130 may search a table containing a list of CAs and their respective statuses. The status of each CA may indicate whether that particular CA is currently handling a call (e.g., facilitating a conversation between a hearing-impaired party and a hearing party), is off-line/not available or is available to help a caller. The table may be stored, for example, in storage device 250 (FIG. 2). The table containing the list of CAs may also include information regarding particular skills of the respective operators at each CA workstation.

For example, the table may include information indicating that an operator speaks a foreign language (e.g., Spanish, French, etc.). The table may also include information indicating that an operator knows sign language, which may be needed if the connection between the hearing-impaired party and the CA involves a video link. The video link may enable the hearing-impaired party and the CA to communicate using sign language.

Server 130 may identify particular needs associated with the hearing-impaired caller based on, for example, the originating telephone number that was used to place the call. For example, server 130 may perform automatic number identification (ANI) to identify the originating telephone number and may use this telephone number to search a database of information regarding hearing-impaired customers. The database may store the telephone numbers of hearing-impaired customers and any special needs (e.g., language requirement) for each of the hearing-impaired customers. In alternative implementations, the hearing-impaired caller may interact with an automated voice menu system at server 130 to input any special requirements.

As an example, assume that the hearing-impaired caller speaks only Spanish. In this case, the hearing-impaired party's Spanish language requirement may be stored in a database at server 130 (or accessible by server 130). In this case, when server 130 is identifying an available CA, server 130 must identify a CA that is able to speak Spanish.

Assume that server 130 identifies an appropriate CA, such as CA 140, as being available to handle the call. Server 130 may then forward the call to CA 140 (act 310). CA 140 may exchange text messages and/or voice messages with the hearing-impaired party to identify a party with whom the hearing-impaired party would like to communicate. For example, CA 140 may transmit text to user device 120 asking the user to provide a terminating telephone number to which he/she would like to connect. CA 140 may also request the name of the hearing-impaired party or an identifier associated with the hearing-impaired party. The identifier may be mapped to a name via a database stored at CA 140 or server 130.

The hearing-impaired party may respond by providing the telephone number to which he/she wishes to connect. The hearing-impaired party may also provide his/her name and the name of the party at the terminating telephone number with whom he/she wishes to communicate. This information may be communicated to CA 140 via text and/or voice communications.

CA 140 receives the terminating telephone number, and optionally, other information provided by the hearing-impaired party (act 320). CA 140 (e.g., the operator at CA 140) may then place a call to the terminating telephone number via a telephone device associated with CA 140 (act 330). In this example, assume that the terminating telephone number corresponds to the telephone number of telephone device 150. Further assume that a hearing party at telephone device 150 answers the call from CA 140.

CA 140 may provide a voice greeting to inform the hearing party that a telephone call from a hearing-impaired person is to commence, along with the name and other information associated with the hearing-impaired party. The operator of CA 140 may also send a text message to user device 120 indicating that the call has been established to the terminating party, i.e., the hearing party (act 330).

The hearing-impaired party may then send a text message to CA 140 via user device 120 (act 340). The text message may be a typical message that the hearing-impaired party wishes to communicate to the hearing party, such as "Hi Bill, this is Joe, how are you doing?" When CA 140 receives the text message, the operator associated with CA 140 voices a message corresponding to the text message to the terminating party (i.e., the hearing party) at telephone device 150 (act 340).

The hearing party may then respond to CA 140 via a conventional voice message (act 350). CA 140, as discussed above, may include voice recognizer 145 that automatically converts voice messages received from the hearing party (or hearing-impaired party) into corresponding text. For example, suppose that the hearing-party at telephone device 150 (e.g., Bill, in the example above) voices a response, such as "Hi Joe, I'm doing fine." Voice recognizer 145 receives the voice message and automatically converts the voiced message into corresponding text using voice or speech recognition (act 350).

The operator at CA 140 may manually correct any errors, if necessary, to the output of the voice recognizer 145 (act 360). For example, an output device associated with CA 140 (e.g., output device 270, FIG. 2) may display the text as it is being generated by voice recognizer 145. The operator at CA 140 may then manually edit the displayed text to make any necessary corrections before the text is transmitted to the hearing-impaired party. CA 140 may then transmit the text message to the hearing-impaired party at user device 120 (act 370).

The hearing-impaired party at user device 120 receives the text message (act 370). The text message may then be displayed at user device 120 for reading by the hearing-impaired-party (act 370).

The "conversation" between the hearing-impaired party and the hearing party may continue in this manner. That is, each time the hearing-impaired party sends a text message, CA 140 voices a message to the hearing party corresponding to the text message. In addition, each time the hearing party responds with a voice message, voice recognizer 145 automatically generates text corresponding to the voice message for transmission to user device 120. The operator at CA 140 may also manually correct the output of voice recognizer 145.

A similar process may occur when a hearing party wishes to initiate communications with a hearing-impaired party. For example, the hearing party at telephone device 150 calls CA 140 (or server 130), who may then initiate a connection to the hearing-impaired party at user device 120. CA 140 may then receive voice messages from the hearing party and voice recognizer 145 may automatically convert the voice messages into text messages. If necessary, the operator at CA 140 may correct any errors. CA 140 may then transmit the text messages along with the voice messages to the hearing-impaired party. CA 140 may also receive text messages from the hearing-impaired party and relay voices messages corresponding to these text messages to the hearing party. In situations in which the hearing-impaired party provides voice messages, these voice messages may be forwarded directly to the terminating party, along with optional text messages based on the speaking ability of the hearing-impaired party.

In some implementations consistent with the invention, voice recognizer 145 may automatically play back the output of the voice recognition process to the hearing party for verification purposes prior to transmitting the corresponding text message to the hearing-impaired party at user device 120. For example, after the hearing party at telephone device 150 voices a message, voice recognizer 145 may determine what was said by the hearing party. Voice recognizer 145 may include a speech synthesizer that automatically sends a voice message back to the hearing party at telephone device 150 corresponding to the output of the voice recognition process. Alternatively, voice recognizer 145 may transmit a text message to the hearing party at telephone device 150 corresponding to the output of the voice recognition process (assuming that telephone device 150 is configured to display text messages). In still other alternatives, voice recognizer 145 may send both a text message and a voice message back to the hearing party at telephone device 150.

In each case, voice recognizer 145 may also include a prompt to the hearing party at telephone device 150 for allowing the hearing party to validate the accuracy of the voice recognition performed by voice recognizer 145. For example, voice recognizer 145 may send the voice message (or text message) to the hearing party at telephone device 150 that represents the output of the voice recognition process. After the voice (or text) message is transmitted, voice recognizer 145 may provide a prompt, such as "If this message is correct, please press 1 or say yes. If this message is not correct, please press 2 or say no." In this manner, voice recognizer 145 may receive feedback from the hearing party prior to the text message being transmitted to the hearing-impaired party at user device 120.

If the hearing party at telephone device 150 verifies that the voice (or text) message is correct, CA 140 may transmit the text message to the hearing-impaired party at user device 120. In the event that the hearing party at telephone device 150 indicates that the message is not correct, voice recognizer 145 may provide another voice and/or text message that corresponds to the next most likely output generated during the voice recognition process. Voice recognizer 145 may follow this second message with another prompt for the hearing party to indicate whether the message is correct.

In the event that the second message generated by voice recognizer 145 is not correct, voice recognizer 145 may request that the hearing party repeat the message so that voice recognizer 145 can retry the voice recognition process. In this case, voice recognizer 145 may process the voice input and generate one or more likely versions of what was said by the hearing party.

In still alternative implementations, voice recognizer 145 may provide two or more alternatives of what was potentially said by the hearing party and transmit both of these alternatives to the hearing party at telephone device 150 at the same time. In this case, voice recognizer 145 may also provide a prompt for instructing the hearing party at telephone device to select which alternative corresponds to what was actually said by the hearing party.

In this manner, voice recognizer 145 may ensure that text messages transmitted to the hearing-impaired party at user device 120 are accurate prior to transmission of these messages. Performing verification in this manner may also eliminate the need for input from an operator at CA 140 to correct any errors and may eliminate the need for an operator at CA 140.

In some implementations consistent with the invention, voice recognizer 145 may store voice files that enhance the ability of voice recognizer 145 to correctly convert the received voice messages into corresponding text. For example, voice recognizer 145 may store voice files based on the telephone number that CA 140 called (i.e., the terminating telephone number provided by the hearing-impaired party) or based on automatic number identification (ANI), if the hearing party called CA 140 to initiate the call.

In either case, voice recognizer 145 may use the stored voice file(s) associated with a particular party's voice to provide more accurate voice-to-text conversion.

For example, voice recognizer 145 may include logic that is able to "learn" and store information with respect to a particular party's speech pattern, accent, etc. Voice recognizer 145 may then use this stored information as a rules or grammars associated with performing speech recognition. In some implementations, voice recognizer 145 may also use information associated with corrections manually performed by the operator at CA 140 (act 360 described above) to aid in the speech recognition.

For example, the corrections made by the operator at CA 140 may be stored by voice recognizer 145. That is, a word/phrase output by voice recognizer 145 may be stored along with the correction to this word/phrase made by the operator at CA 140. As an example, assume that voice recognizer 145 has stored the word "towed" generated by voice recognizer 145 along with the correction "told", based on a previous correction made by the operator at CA 140. If voice recognizer 145 is determining whether the caller voiced the word "told" or "towed" in a later voice message, voice recognizer 145 may access the stored voice file to determine whether either word was previously corrected by the operator at CA 140. In this example, voice recognizer 145 determines that "towed" was corrected by the operator at CA 140 to "told" and therefore, voice recognizer 145 may determine that the most likely voiced word is "told".

Voice recognizer 145 may continue to store corrections and may also learn particular nuances associated with a party's speech pattern, accent, etc., to aid in generating text that accurately corresponds to the actual voiced message.

As described above, text messages may be transmitted by CA 140 to a hearing-impaired party at user device 120. In an exemplary implementation consistent with the invention, the voice message from the hearing party may also be transmitted with the corresponding text generated by voice recognizer 145 to the hearing-impaired party. For example, the connection between CA 140 and user device 120 may be a persistent, full duplex connection that allows for the simultaneous transmission of the voice messages from the hearing party along with the corresponding text messages.

As described herein, the term "persistent, full duplex" refers to a communication link that is always connected and allows both parties to simultaneously transmit information. Such links do not require either the hearing-impaired party or the party at the opposite end (e.g., an operator at CA 140) to press a "send" or "receive" button. Further, such full duplex links allow each party to view messages in a streaming manner. That is, as one of the parties types text messages, the other party is able to see the text as it is being typed in real-time or near real-time.

In such an implementation, CA 140 may be configured to communicate with user device 120 through server 130. In this case, CA 140 may have a connection with server 130 that provides persistent, full duplex communications from CA 140 to user device 120, via server 130. Alternatively, CA 140 may establish a persistent, full duplex connection directly with user device 120. Details of forming such connections are not described herein, but would be obvious to one of ordinary skill in the art.

Using a full duplex link between user device 120 and CA 140 helps prevent the "conversation" between the hearing-impaired party at user device 120 and the operator at CA 140 from getting out of synchronization when communicating with each other, which may occur when using some types of text messaging, such as instant messaging. In addition, using a persistent, full duplex link helps speed up the conversation since responses or additional messages may be typed as one of the parties is still receiving part of a text message. This may also result in the increased use of services of a CA since the text-based conversation between the hearing-impaired party and the hearing party may take place in a very efficient manner. In addition, a hearing-impaired party may place multiple calls using a single socket connection. That is, the socket connection between user device 120 and CA 140 may not have to be re-initialized each time a particular conversation ends.

As described above, systems and methods consistent with the present invention facilitate communications between hearing-impaired parties using voice recognizer 145 to facilitate communications involving hearing-impaired parties. In addition, a text-to-voice converter may also be used by CA 140. For example, text messages sent to CA 140 from user device 120 may be automatically converted to voice messages using text-to-voice software executed by CA 140. The voice messages may then be transmitted to the hearing party at telephone device 150. This may eliminate the need for a human operator at CA 140.

In an alternative implementation consistent with the invention, a high speed text input device may be used instead of, or in conjunction with, voice recognizer 145. In this implementation, a stenographic machine or similar device may allow an operator at CA 140 to type text in a different format than that obtained via a conventional keyboard. The text inputted via the high speed text input device may be translated into the full text that was actually spoken by the hearing party.

For example, suppose that CA 140 receives a voice message from the hearing party at telephone device 150 (FIG. 3, act 350). In this implementation, CA 140 may include a stenographic device that allows the operator at CA 140 to input the text using conventional stenography. Alternatively, CA 140 may include a communication access real-time translation (CART) device or another "short cut" typing device that allows the operator at CA 140 to enter text more quickly than conventional typing. In each case, as the operator at CA 140 types, software executed by CA 140 converts the input entered by the operator into full text for display on an output device (e.g., output device 270, FIG. 2). In other words, CA 140 converts the inputted stenographic type data into readable text corresponding to what was actually spoken by the hearing party. The operator at CA 140 may edit the displayed full text, if necessary, and transmit the full text to the hearing-impaired party at user device 120.

In this implementation, using a high speed text input device allows an operator at CA 140 to use short cuts as compared to typing using a conventional keyboard. This enables the operator at CA 140 to input data at a high rate, with the inputted data being converted into the full text actually spoken by the hearing party. This permits the operator at CA 140 to keep pace with typical rates of speech, without requiring the speaking party to slow down and without interrupting the speaking party. In this manner, the resulting conversation between the hearing-impaired party and the hearing party proceeds in a more natural manner. In addition, as discussed above, both the voice messages from the hearing party and the text messages may be simultaneously transmitted to the hearing-impaired party over a full duplex connection.

CONCLUSION

Systems and methods consistent with the invention facilitate communications between hearing-impaired parties and hearing parties. An advantage of the invention is that hearing-impaired parties and other parties may be able to initiate communications using any device that is able to transmit and receive some form of text messages. Another advantage of the invention is that the speed with which the conversation between a hearing-impaired party and another party proceeds may be increased, as compared to conventional systems.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

For example, implementations consistent with the present invention may be used in any TRS environment, including VCO, HCO and STS environments. In addition, implementations consistent with the present invention are not limited to any particular voice recognition software and/or hardware, high speed data input device or text-to-voice software and/or hardware. Further, implementations consistent with the present invention may be used in Internet protocol (IP)-based systems, such as those compatible with V.90 and V.91 protocols.

The present invention has also been described with the example of a hearing-impaired party initiating a telephone call to a hearing party and communicating with CA 140 using any conventional text messaging program. In other implementations, server 130 and or CA 140 may provide the user with a choice of text messaging programs, including conventional instant messaging (IM) programs. In such implementations, the user may select the particular IM program through which he/she would like to communicate. Voice recognizer 145 or the high speed input device at CA 140 may then transmit the text messages to the hearing-impaired party at user device 120 using the selected text messaging program (e.g., IM program). In addition, in some implementations, modifications to some conventional text messaging programs may be needed to facilitate communications between a hearing-impaired party, a CA and a hearing party.

Lastly, a series of acts has been described with respect to FIG. 3. The order of the acts may be varied in other implementations consistent with the present invention. Moreover, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on", as used herein is intended to mean "based, at least in part, on" unless explicitly stated otherwise.

The scope of the invention is defined by the claims and their equivalents.

What is claimed is:

1. A method for providing communication services for communications between a hearing-impaired party and a hearing party, comprising:

establishing a voice link with the hearing party;

receiving a first voice message from the hearing party via the voice link;

identifying the hearing party based on a telephone number associated with the hearing party;

accessing at least one stored file based on the identified hearing party, the at least one stored file including a plurality of words and a plurality of corresponding corrections made by an operator in previous voice messages from the hearing party;

generating a first text message corresponding to the first voice message using voice recognition and the at least one stored file, wherein the generating a first text message includes:

identifying, in the first voice message, one of the plurality of words stored in the at least one stored file, and using one of the plurality of corrections corresponding to the identified one of the plurality of words as the most likely word for the identified one of the plurality of words voiced in the first voice message; and transmitting the first text message to the hearing-impaired party.

2. The method of claim 1, further comprising:

receiving a second text message from the hearing-impaired party;

generating a second voice message corresponding to the second text message using text-to-voice software; and transmitting the second voice message to the hearing party.

3. The method of claim 1, further comprising:

reading, by a communication assistant, the first text message; and modifying, by the communication assistant, the first text message based on the received first voice message before transmitting the first text message to the hearing-impaired party.

4. The method of claim 1, wherein the at least one stored file comprises a voice file.

5. The method of claim 1, further comprising:

simultaneously transmitting the first text message and the first voice message to the hearing-impaired party.

6. The method of claim 1, wherein the at least one stored file comprises:

a file storing rules or grammars associated with speech of the hearing party.

7. A method for providing communication services for communications between a first party and a second party, comprising:

establishing a voice link with the first party;

receiving a first voice message from the first party via the voice link;

identifying the first party based on at least one of automatic number identification or a telephone number provided by the second party;

accessing at least one stored voice file associated with the identified first party, the at least one stored voice file including a plurality of words and a plurality of corresponding corrections made by an operator in previous voice messages from the first party;

generating a first text message corresponding to the first voice message using voice recognition and the at least one stored voice file; and transmitting the first text message to the second party.

8. The method of claim 7, wherein the identifying the first party comprises identifying the first party based on automatic number identification.

9. A system, comprising:

a server configured to:

receive a call from a hearing-impaired party for establishing a communication link to a hearing party, identify a communication assistant, and forward the call to the identified communication assistant; and a first device associated with the identified communication assistant, the first device being configured to:

receive the forwarded call from the server, establish a voice link with the hearing party, identify at least one stored file associated with the hearing party the at least one stored file comprising a plurality of words and a plurality of corresponding corrections made to the plurality of words in previous calls to or from the hearing party, receive a voice message from the hearing party, and generate a text message corresponding to the voice message using voice recognition and the at least one stored file, wherein the generating a text message includes:

identifying, in the voice message, one of the plurality of words stored in the at least one stored file, and using one of the plurality of corrections corresponding to the identified one of the plurality of words as the most likely word for the one of the plurality of words voiced in the voice message.

10. The system of claim 9, wherein the first device is further configured to:

transmit the text message to the hearing-impaired party.

11. The system of claim 10, wherein the first device comprises a workstation associated with the identified communication assistant.

12. The system of claim 9, wherein the first device is further configured to:

receive text messages from the hearing-impaired party, and generate voice messages corresponding to the text messages using text-to-voice software.

13. The system of claim 9, wherein the at least one stored file associated with the hearing party comprises a voice file.

14. The system of claim 9, wherein when identifying the at least one stored file, the first device is configured to:

identify the hearing party using automatic number identification or identify the hearing party based on a telephone number provided by the hearing-impaired party.

15. The system of claim 14, wherein when identifying the at least one stored file, the first device is further configured to:

identify the at least one stored file based on the identified hearing party.

16. The system of claim 9, wherein the at least on stored file comprises:

a file storing rules or grammars associated with speech of the hearing party.

17. A system comprising:

a server configured to:

receive a call from a hearing-impaired party for establishing a communication link to a hearing party, identify a communication assistant, and forward the call to the identified communication assistant; and at least one device associated with the identified communication assistant, the at least one device being configured to:

receive the forwarded call from the server, establish a voice link with the hearing party, receive a voice message from the hearing party, and execute voice recognition software to generate a text message corresponding to the voice message; and a memory configured to store voice files associated with a plurality of parties, wherein when generating the text message, the at least one device is configured to:
- identify the hearing party based on a telephone number associated with the hearing party,
- access at least one stored voice file associated with the identified hearing party. the at least one stored voice file comprising a plurality of words and a plurality of corresponding corrections associated with previous voice messages,
- determine, using the at least one stored voice file, whether one of the words in the voice message corresponds to a word in the at least one stored voice file, and
- automatically provide, in the text message, the correction corresponding to the one of the words when one of the words in the voice message corresponds to a word in the at least one stored voice file.

18. The system of claim 17, wherein when identifying the hearing party, the at least one device is configured to identify the hearing party using automatic number identification.

19. A method for providing communications services, comprising:
- receiving a call from a hearing-impaired party for establishing a communication link to a hearing party;
- identifying a communication assistant;
- forwarding the call to the identified communication assistant;
- establishing, by the communication assistant, a voice link with the hearing party;
- receiving, by the communication assistant, a voice message from the hearing party via the voice link;
- identifying the hearing party based on a telephone number associated with the hearing party;
- accessing at least one stored file associated with the identified hearing party, the at least one stored file comprising a plurality of words and a plurality of corrections made in previous voice messages from the hearing party;
- generating, by the communication assistant, a text message corresponding to the voice message using a high speed text input device and the at least one accessed file; and
- transmitting the text message to the hearing-impaired party.

20. The method of claim 19, wherein the high speed text input device comprises a communication access real-time translation device.

21. The method of claim 19, wherein the high speed text input device comprises a stenographic input device and the generating a text message includes automatically converting output of the stenographic input into readable text representing the voice message.

22. The method of claim 19, further comprising:
- transmitting the voice message to the hearing-impaired party simultaneously with the text message.

23. The method of claim 19, wherein the at least one stored file comprises:
- a file storing rules or grammars associated with speech of the hearing party.

24. A system, comprising:
- means for establishing a voice link with a first party;
- means for receiving a voice message from the first party via the voice link;
- means for identifying the first party based on a telephone number associated with the first party;
- means for accessing at least one stored file associated with the first party;
- means for automatically generating a text message corresponding to the voice message using the at least one stored file, the at least one stored file comprising a plurality of words and a plurality of corrections made in previous voice messages from the first party; and
- means for transmitting the text message to a second party.

25. The system of claim 24, wherein the second party represents a hearing-impaired party and the means for automatically generating a text message comprises voice recognition software.

26. A system, comprising:
- processing logic configured to:
  - receive a voice message from a first party,
  - identify the first party based on a telephone number associated with the first party,
  - access at least one stored file associated with the identified first party, the at least one stored file comprising a plurality of words and a plurality of corresponding corrections made in previous voice messages from the first party, and
  - generate a text message corresponding to the voice message using voice recognition and the at least one stored file; and
- a transmit element configured to transmit the text message to a hearing-impaired party.

27. The system of claim 26, further comprising:
- an output device for displaying the text message prior to transmitting the text message.

28. The system of claim 26, further comprising:
- a telephone device configured to receive a telephone call from the hearing-impaired party and establish a bridge connection with the first party.

29. The system of claim 26, wherein the at least on stored file comprises:
- rules associated with performing voice recognition for the first party or a voice file associated with the first party.

30. A method, comprising:
- receiving a first voice message from a hearing party via a voice link;
- identifying the hearing party based on a telephone number associated with the hearing party;
- accessing at least one stored file associated with the identified hearing party, the at least one stored file comprising a plurality of words and a plurality of corresponding corrections made in previous voice messages from the hearing party;
- generating at least one of a second voice message or a first text message corresponding to the first voice message using voice recognition and the at least one stored file; and
- transmitting the at least one of the second voice message or first text message to the hearing party for verification.

31. The method of claim 30, further comprising:
- transmitting a prompt to the hearing party providing instructions for verifying that the at least one of the second voice message or first text message is correct.

32. The method of claim 30, further comprising:
- receiving an indication from the hearing party that the at least one of the second voice message or first text message is correct; and
- transmitting the first text message to a hearing-impaired party.

33. The method of claim 30, further comprising:
receiving an indication from the hearing party that the at least one of the second voice message or first text message is not correct;
generating at least one of a third voice message or a second text message corresponding to the first voice message; and
transmitting the at least one of the third voice message or second text message to the hearing party for verification.

34. The method of claim 33, further comprising:
receiving an indication from the hearing party that the at least one of the third voice message or the second text message is not correct; and
requesting that the hearing party repeat the first voice message.

35. The method of claim 30, wherein the at least one stored file comprises:
a file storing rules associated with performing voice recognition for the identified hearing party or a voice file associated with the identified hearing party.

36. A system, comprising:
processing logic configured to:
receive a first voice message from a hearing party via a voice link,
identify the hearing party based on a telephone number associated with the hearing party,
access at least one stored file associated with the identified hearing party, the at least one stored file comprising a plurality of words and a plurality of corresponding corrections made in previous voice messages from the hearing party,
generate at least one of a second voice message or a first text message corresponding to the first voice message using voice recognition and the at least one stored file, and
transmit the at least one of the second voice message or first text message to the hearing party for verification.

37. The system of claim 36, wherein the processing logic is further configured to:
transmit instructions for verifying that the at least one of the second voice message or first text message is correct.

38. The system of claim 36, wherein the processing logic is further configured to:
receive an indication from the hearing party that the at least one of the second voice message or first text message is correct, and
transmit the first text message to a hearing-impaired party.

39. The system of claim 36, wherein the processing logic is further configured to:
receive an indication from the hearing party that the at least one of the second voice message or first text message is not correct,
generate at least one of a third voice message or a second text message corresponding to the first voice message, and
transmit the at least one of the third voice message or second text message to the hearing party for verification.

40. The system of claim 39, wherein the processing logic is further configured to:
receive an indication from the hearing party that the at least one of the third voice message or the second text message is not correct, and
transmit a request that the hearing party repeat the first voice message.

* * * * *